United States Patent
Grandjean

(10) Patent No.: US 6,705,178 B1
(45) Date of Patent: Mar. 16, 2004

(54) MOTOR VEHICLE LOCKING DEVICE WITH CABLE CONTROL FOR INSIDE OPENING AND OUTSIDE OPENING

(75) Inventor: Richard Grandjean, Sainte Marguerite (FR)

(73) Assignee: Meritor Light Vehicle Systems-France (FR)

( * ) Notice: Subject to any disclaimer, the term of this patent is extended or adjusted under 35 U.S.C. 154(b) by 0 days.

(21) Appl. No.: 09/424,648

(22) PCT Filed: May 29, 1998

(86) PCT No.: PCT/FR98/01096

§ 371 (c)(1),
(2), (4) Date: Mar. 20, 2000

(87) PCT Pub. No.: WO98/55718

PCT Pub. Date: Dec. 10, 1998

(30) Foreign Application Priority Data

Jun. 2, 1997 (FR) .............................. 97 06756

(51) Int. Cl.⁷ .............................. F05B 3/00; F16C 1/10
(52) U.S. Cl. .................... 74/502.4; 74/502.6; 74/500.5; 74/501.5 R; 292/336.3; 292/DIG. 31
(58) Field of Search ................. 74/501.5 R–502.6; 292/216, 336.3, DIG. 23, DIG. 25, 225, 125, DIG. 65, DIG. 21

(56) References Cited

U.S. PATENT DOCUMENTS 3,777,425 A * 12/1973 Le Bourgeois .................. 52/2
4,907,428 A     3/1990 Nakashima et al.
4,945,784 A *  8/1990 Gergoe ................... 74/501.5 R
5,263,751 A * 11/1993 Priest et al. ............. 292/336.3
5,579,663 A * 12/1996 Likich et al. ............... 74/502.5
5,618,069 A *  4/1997 Konchan et al. ............ 292/216
5,681,068 A * 10/1997 Kleefeldt et al. ......... 292/336.3
6,050,619 A *  4/2000 Arabia et al. ............... 292/216
6,062,615 A *  5/2000 Hunt et al. ............... 292/336.3

FOREIGN PATENT DOCUMENTS

EP    0475037 A1 *  3/1992 ................ 74/502.4
EP    0728885      8/1996
FR    2715688   *  8/1995 ................ 74/502.6

* cited by examiner

Primary Examiner—Vinh T. Luong
(74) Attorney, Agent, or Firm—Wood, Phillips, Katz, Clark and Mortimer

(57) ABSTRACT

This device features a spout (13, 23) for guiding one end of the operating cable (4) as far as the external opening lever (3); the spout is formed opposite one fork-shaped end (17) of the lever (3) and with the latter it delimits a passage (19) for introducing the ferrule (5) of the cable (4) after the ferrule has passed through a sheath abutment (9), this arrangement making it possible for the ferrule (5) to automatically hook itself "blind" to the external opening lever (3). Whereupon the length of the end of the cable (4) projecting on the operating side can be adjusted in order to eliminate freeplay in the device and to tension the cable.

11 Claims, 10 Drawing Sheets

MOTOR VEHICLE LOCKING DEVICE WITH CABLE CONTROL FOR INSIDE OPENING AND OUTSIDE OPENING

BACKGROUND OF THE INVENTION

Field of the Invention

The present invention relates to an automotive vehicle side door locking device, having a system for operating an external opening lever and an internal opening lever via cables, the cables being connected to the respective external opening handle and internal opening handle of the vehicle.

The present invention relates to an automotive vehicle side door locking device, having a system for operating an external opening lever and an internal opening lever via cables, the cables being connected to the respective external opening handle and internal opening handle of the vehicle.

Complementing this device, the invention also relates to a method for regulating the length of the cables operating the internal opening lever and the external opening lever.

This method of operating the opening of the lock via cables offers a twin-pronged advantage: on the one hand it provides better security against theft, because the cables, being sheathed, are practically burglarproof; on the other hand, in the event of an accident involving a side impact, a relative movement of the lock in relation to its operation will not cause the door to open at an inopportune moment during the impact, or make it difficult to open the door following the impact, contrary to what happens when rigid operating rods are employed.

In these devices the lock and its cable-operated system form a completely sealed unit, making it difficult for the fitter to install the cable system without having sight of it.

In accordance with the invention, the device comprises means for guiding one end of an operating cable as far as the external opening lever, making it possible to quite safely fit the cable "blind" onto the lock.

Since there is a ferrule attached to the end of the cable, these guiding means enable the operator to introduce the ferrule close to the end of the external opening lever until it reaches a position in which it is now possible for the cable to automatically introduce itself into a terminally configured slot in the external opening lever, the cable being retained in a suitable position to enable the cable and the ferrule to be hooked up.

According to one form of embodiment, the device is characterised in that said means comprise a ferrule guiding spout, formed on the side of a housing for the lock and extended outwards by a sheath abutment; the spout is disposed opposite a free end of the external opening lever so as to delimit with said free end a passage for introducing the ferrule until it reaches a position in which it can automatically hook itself to said free end of the lever.

According to another feature of the invention, the device comprises a cable-operated system for controlling the internal opening lever, means for guiding one end of the cable as far as the internal opening lever positioned in the lock opening setting when the lock is fitted, and means for retaining said lever in the opening position while the end of the cable is being introduced as far as the lever.

The invention likewise relates to a method for regulating the length of the cables operating the external and internal opening levers, more particularly the cable length delimited between a manual operating handle and a coupled sheath abutment.

This method involves:

a) locking the external opening lever in the rest position (closure position) or leaving the internal opening lever in the closure position;

b) introducing a shim of known length between the sheath limit stop located on the operating handle side, and said handle;

c) pushing the sheath limit stop onto the regulating shim, thereby putting the cable under tension;

d) attaching a second sheath limit stop, situated on the lock side, onto the associated sheath abutment, for example by ultrasonic sealing.

Once this series of steps has been carried out, the size of the stump of cable projecting from the sheath abutment on the operating side is regulated, and the cable is put under tension, all the device's tolerances having been absorbed.

Further features and advantages of the invention will become apparent from the following description, referring also to the accompanying drawings which illustrate one form of embodiment thereof by way of non-restrictive example.

DETAILED DESCRIPTION OF THE DRAWINGS

Figure 1:
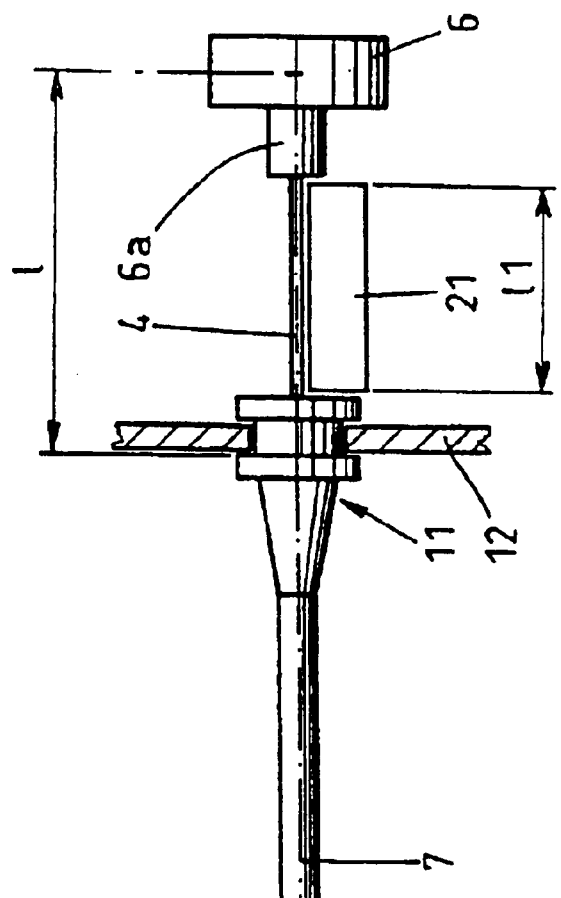
FIG. 1 shows a longitudinal elevation of an embodiment of the general device for cable operation of one of the opening levers of a lock (not shown).
Figure 1:
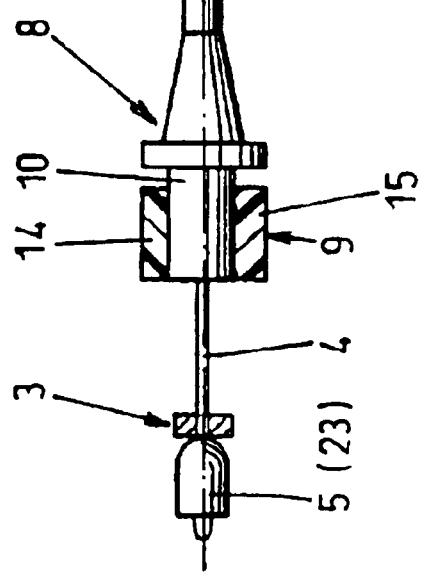
Figure 2:
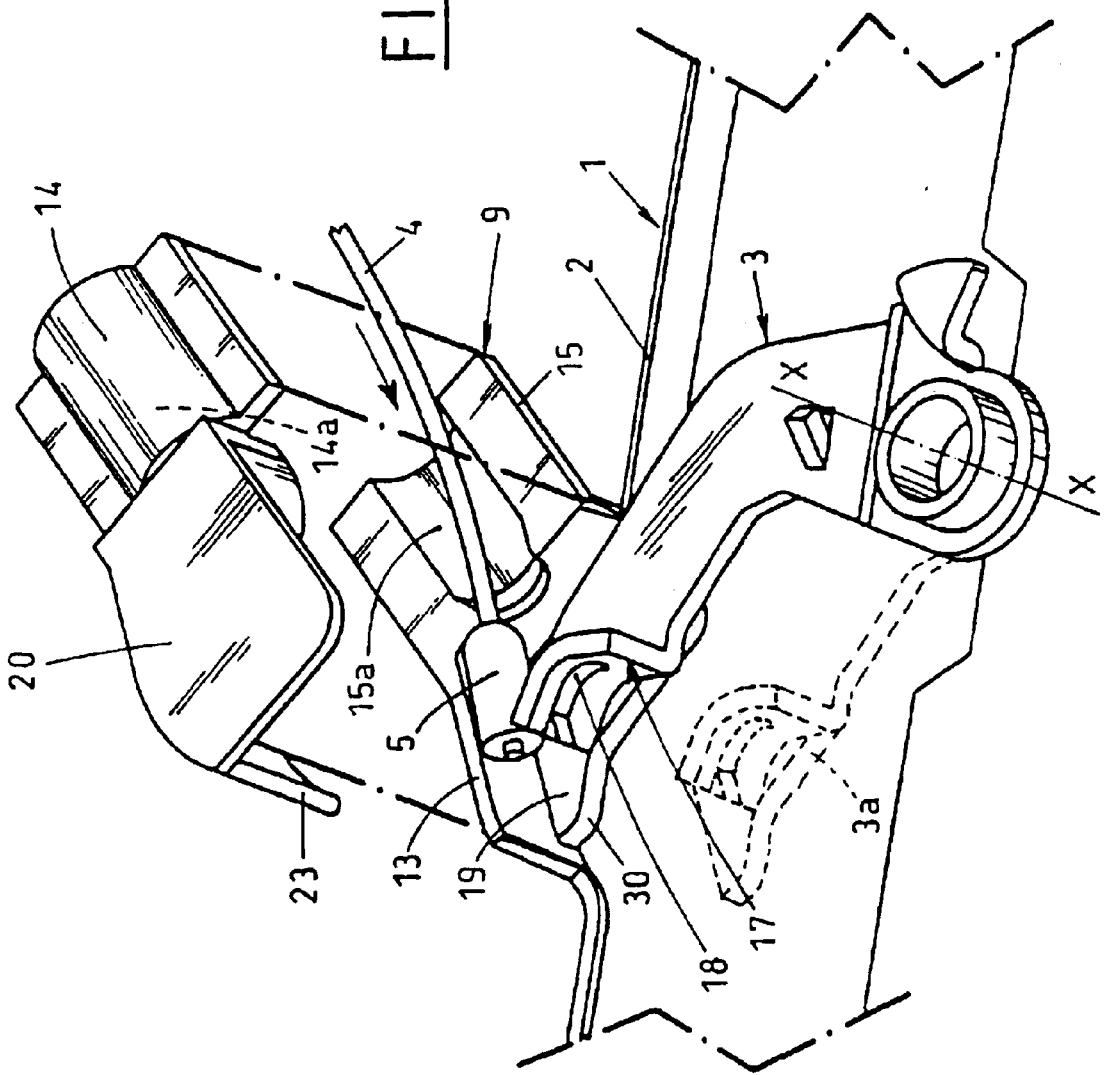
FIG. 2 is a scaled-up, partly perspective view showing the external opening lever of a lock and the associated part of the cable-operated system in accordance with one form of embodiment of the invention, the end ferrule of the operating cable having been introduced in the guiding means.
Figure 3:
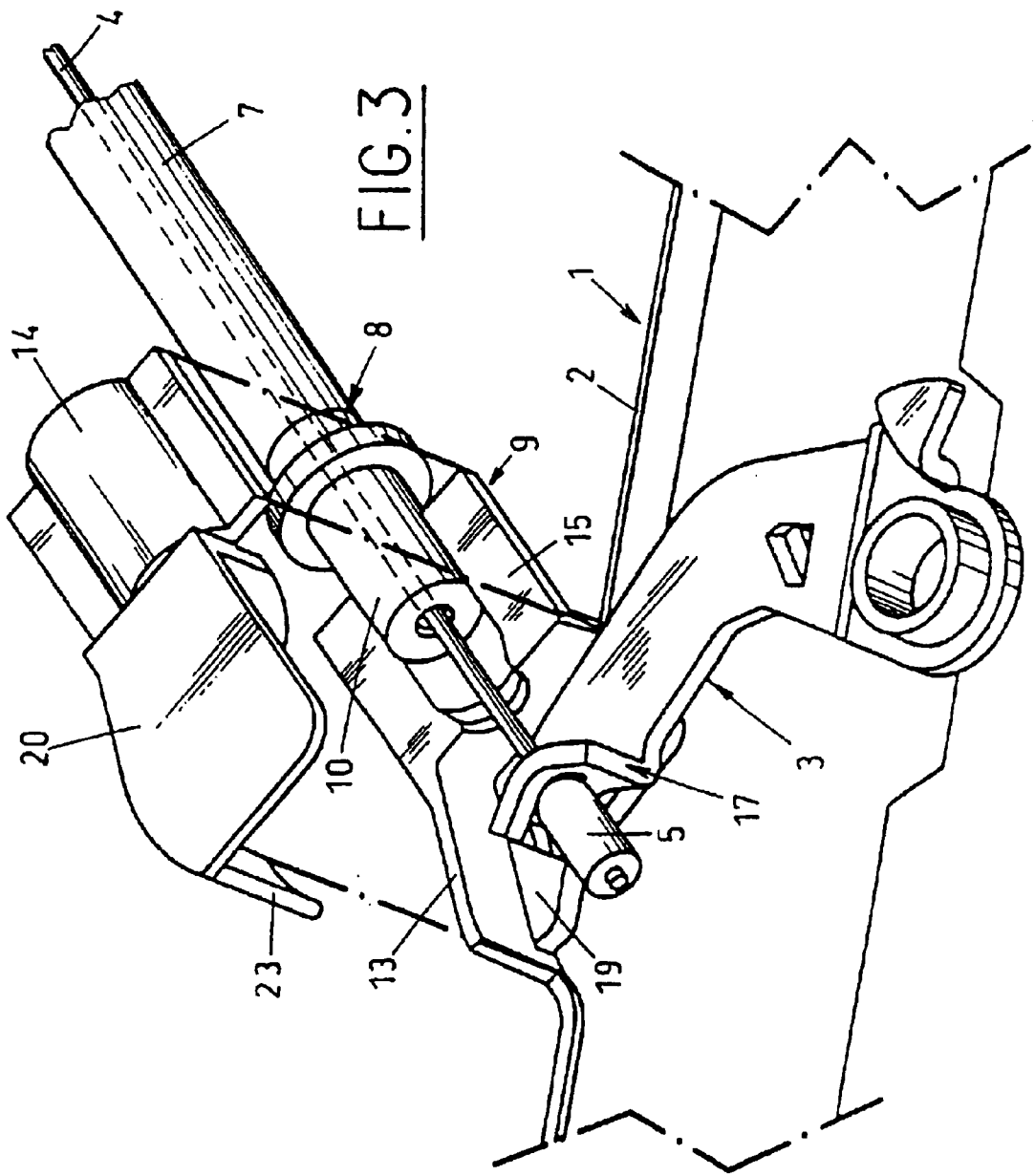
FIG. 3 is a view similar to FIG. 3, depicting the next phase in which the ferrule is hooked up to the external opening lever and the sheath limit stop and the sheath containing the cable are placed in position.
Figure 4:
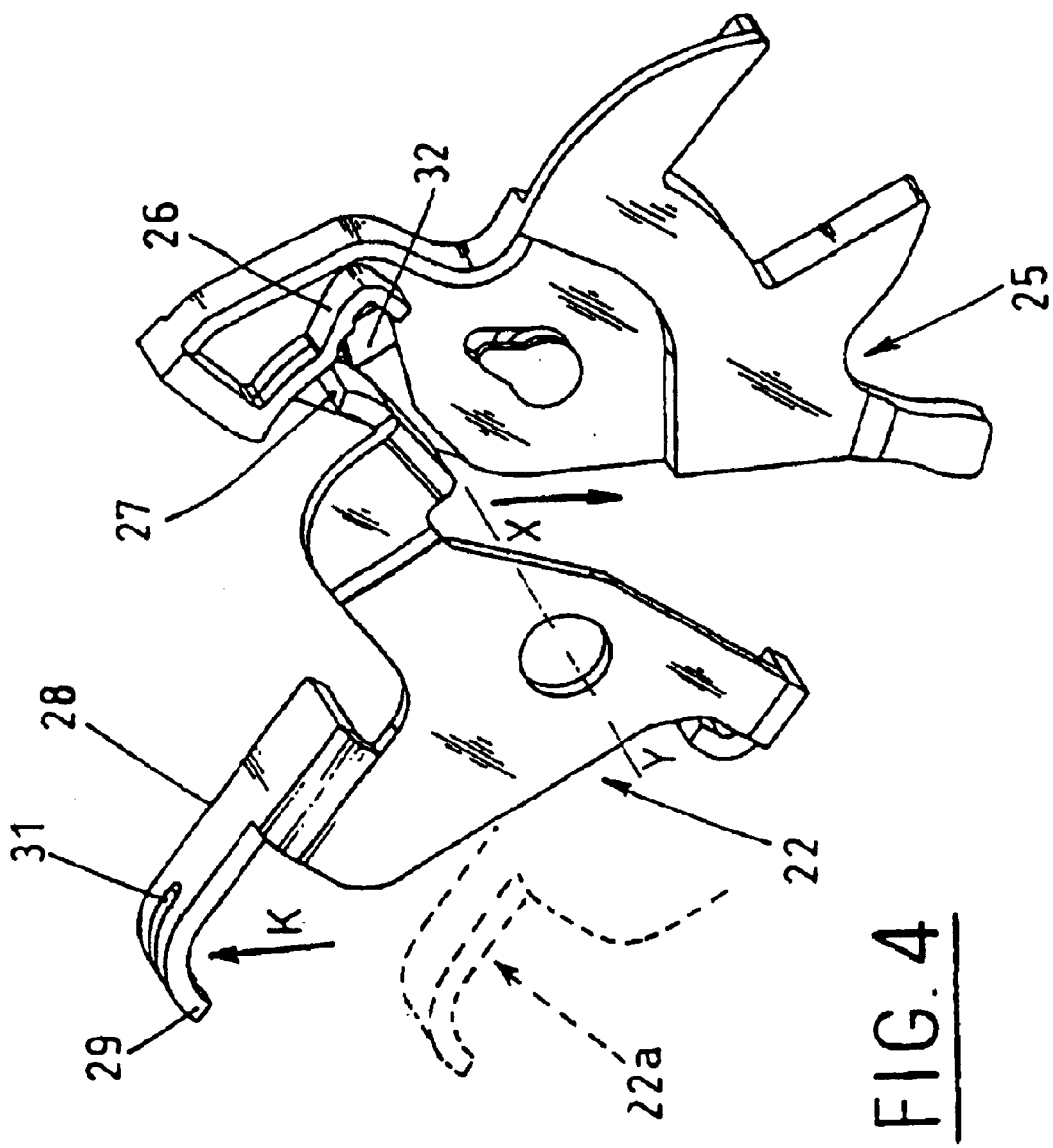
FIG. 4 is a partly perspective view depicting the internal opening lever of a lock (not shown) and an associated security unlatching element, these parts being shown in the internal opening lever positioning phase prior to hooking up the ferrule of the corresponding operating cable.
Figure 5:
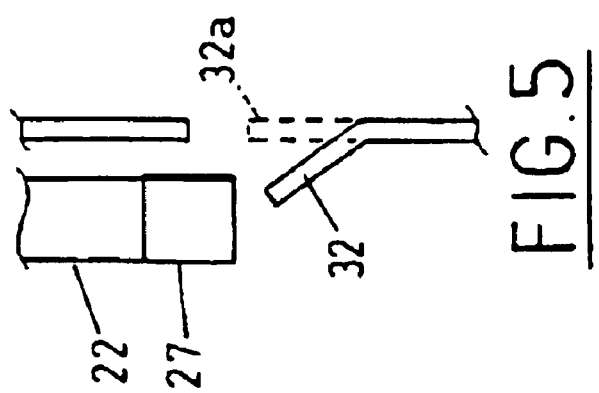
FIG. 5 is a scaled-up sectional view of a detail from FIG. 4.

The automotive vehicle locking device depicted in FIGS. 1 to 3 comprises a lock 1, of which only a housing 2 and an external opening lever 3 are represented, together with a system for operating the lever 3 by a cable 4 accommodated in a sheath 7.

On the lock 1 side, the end of the cable 4 carries a ferrule 5 whereas its opposite end, on the operating side, is provided with a T-shaped end piece 6 for manually operating the external opening lever 3. The end piece 6 is attached to a manual operating handle by per se known means (not shown).

On the lock 1 side, the sheath 7 terminates in a sheath limit stop 8 which comes up against a sheath abutment 9. At its opposite end, on the operating side, the sheath 7 terminates in a second sheath limit stop 11 which cooperates with a sheath abutment 12, from which the cable 4 projects by a given length to form a datum between the centre of the control end piece 6 and the datum plane of the sheath abutment 12.

The means for guiding the end of the cable 4 and the ferrule 5 as far as the lever 3 comprise a half-spout 13 formed on the side of the housing 2 and extended outwards by the sheath abutment 9, the latter being constituted by a sheath half-abutment 14 and a complementary sheath half-abutment 15. A half-spout 23, coupled to a hood 20, completes the half-spout 13. Incorporated in the sheath half-abutments 14 and 15 are seats 14a and 15a for receiving a cylindrical portion 10 of the sheath limit stop 8.

The external opening lever 3 is articulated for rotation about a swivelling axis XX on the housing 2, and is returned to its rest position 3a by a spring (not shown). The free end of the lever 3 is disposed facing the spout (13, 23) and is provided with a concave profiled configuration 17 incorporating a slot 18 such that the configuration 17 constitutes a terminal fork directed towards the spout (13, 23), delimiting with the latter a passage 19 for the ferrule 5. The passage 19 is delimited by a base 30 which extends beneath the configuration 17, through the side wall of the spout (13, 23) and through the cover 20.

The ferrule 5 and the end of the cable 4 may be introduced from the exterior into the seat 14a, 15a formed by joining together the sheath half-abutments 14, 15, until the ferrule 5 reaches the passage delimited by the end of the fork 17 and the spout (13, 23), being guided through the wall of the latter, its base 30 and its cover 20 (see FIG. 2).

a) With the lever 3 in its rest position 3a in which it is elastically returned by its spring, the operator pushes the lever 3 by tipping it against the restoring force of its spring, until it moves into the position represented by the solid line in FIG. 2, and holds the lever 3 in that position with the help of a tool (not shown).

b) The operator takes the cable 4 and introduces its ferrule 5 into the seat 14a, 15a, the two halves 14, 15 of the sheath abutment 9 not being attached to one another at this stage. Pushing on the cable 4 causes the ferrule 5 to enter the passage 19 between the guiding spout 13 and the fork 17 of the lever 3, this movement being guided by the funnel-shaped profile of the spout (13, 23), of the base 30 and of the cover 20.

c) The ferrule 5 projects from the fork 17, and then due to the cable's natural rigidity it automatically lodges behind said fork 17 (see FIG. 3) at the same time as the cable 4 enters the slot 18. The end 5 of the cable 4 is now hooked to the external opening lever 3.

d) The operator releases the tool holding the lever 3 in the end-of-travel position, with the result that the spring of the lever 3 returns the latter to its rest position 3a, and the cable 4 tautens.

e) A regulating operation is now carried out on the length I of the cable 4 projecting from the sheath abutment 12 as far as the control end piece 6, by applying a method likewise forming an object of the invention.

This regulation is performed in the following manner:

the external opening lever 3 is locked in its rest position 3a (FIG. 2);

a shim 21 of known size II, laid down by the specification, is introduced between the sheath limit stop 11 situated on control end piece 6 side, and the end 6a thereof (see FIG. 1);

a sheath limit stop 11 is pushed by hand onto the regulating shim 21, which places the cable 4 under tension;

the second sheath limit stop 8, situated on the lock 1 side, is attached to the sheath limit stop 9, for example by ultrasonically sealing the housing 14 and the cover 15 onto the cylindrical portion 10 of the sheath limit stop 8.

At this stage the length I of the projecting end of the cable 4 is regulated appropriately, all the device's tolerances having been absorbed.

Accordingly any idle travel between the ferrule 5 and the external opening lever 4 is avoided.

There now follows a description, referring to FIGS. 4 to 11, of the system for operating the internal opening lever 22 of the lock 1 via cable.

The internal opening lever 22 is articulated on an axis YY and is returned to a lower rest position 22a by a return spring (not shown) in a manner known per se. This lower position 22a is that in which the door is locked, whereas its upper position (indicated by the solid line in FIG. 4) allows the lock to be released and the door of the vehicle to be opened.

The invention provides means for holding the lever 22 in the upper, opening position whilst the end of the corresponding cable 24 is being introduced (see FIG. 7) as far as the lever 22.

In the embodiment being described, these means for holding the lever 22 in the opening position comprise a security latching element 25 provided with a suitably profiled configuration 26 which is arranged so as to cooperate, after rotating towards the lever 22, with a tongue 27 of the lever 22 in order to bring about locking of the latter in the raised, lock opening position.

The tongue 27 is formed on one end of the lever 22 opposing its branch 28 bearing a curved terminal fork 29 incorporating a longitudinal slot 21, which is designed to receive the end of the cable 24. The lever 22 and the security latching element 25 are positioned with respect to one another in such a manner that when-the lever 22 rotates clockwise its terminal tongue 27 moves inside the concave configuration 26 and interlocks therein. This interlocking consequently prevents the lever 22 from moving back in an anti-clockwise direction, said lever 22 now being held in the upper position, in which the lock is opened. The element 25 is provided with a flexible lug 32 positioned inside the profiled configuration 26 such that it protrudes transversely in the free state, facing the tongue 27 (see FIG. 5).

It is only possible to introduce the tongue 27 into the position in which the lever 22 becomes interlocked in the concave configuration 26 if before hand the flexible lug 32 has been removed from the path of the tongue 27, by depressing it manually in the transverse direction until it reaches a position 32a in which it is located substantially in the plane of the element 25 and clears the way for the tongue 27 to pass.

This is because once this lug 32 has been depressed into the retracted position 32a, the tongue 27 is able to move fully inside the concave configuration 26, thereupon the lug 32 then repositions itself behind the tongue 27 by means of elastic resilience. However, in this second position it is no longer able to hinder the tipping of the lever 22 from its upper, opening position to its lower position 22a, for the tongue 27 is able to move back again by sliding over the lug 32.

The terminal fork 29 of the lever 22 is positioned inside a spout for guiding the ferrule 33 fixed on the end of the operating cable 24. This guiding spout is delimited by an assembly of ribs 34, 35 incorporated in the wall of the cover 20 of the lock 1. This assembly is formed by a first group of parallel ribs 34 and by a second group of parallel ribs 35, separated by respective gaps 38 positioned opposite one another at an interval which delimits the spout 41 for introducing and guiding the ferrule 33 as far as a position (see FIG. 7) where, being situated just below the fork 29 of the lever 22, the cable 24 is able to introduce itself into the slot 31 and the ferrule 33 to hook itself inside the concave area of the fork 29 (see FIG. 8).

The security latching element 25 can be rotated by a segment-shaped lever 36 (see FIGS. 9 and 11) carrying a toothed segment 37 adapted to cooperate in a per se known manner with the element 25 and driven by a centralised security latching motor (not shown).

The ribs 34, 35 are joined to the cover 20 by the faces 34a, 35a, which are adapted to hook into corresponding gaps 38 in the ribs (34, 35) close to a sheath abutment 39 on either side of the entrance to the guiding spout 21. The cable 24 is fitted with a sheath limit stop 42 which is adapted to introduce itself into the sheath abutment 39.

The operator pushes the flexible lug 32, either by hand or using a tool, as far as its lowered position 32a, in order to clear the way for the tongue 27 of the internal opening lever 22. With the lever 22 initially in the rest position 22a, corresponding to the lock being in the interlocked position in which it is held by its return spring, the operator tips the lever 22 upwards (arrow K in FIG. 4) to bring it into the upper, lock opening position, ready to receive the ferrule 33 and the cable 24.

The operator pushes the flexible lug 32, either by hand or using a tool, as far as its lowered position 32a, in order to clear the way for the tongue 27 of the internal opening lever 22.

With the lever 22 initially in the rest position 22a, corresponding to the lock being in the interlocked position in which it is held by its return spring, the operator tips the lever 22 upwards (arrow K in FIG. 4) to bring it into the upper, lock opening position, ready to receive the ferrule 33 and the cable 24.

Figure 6:
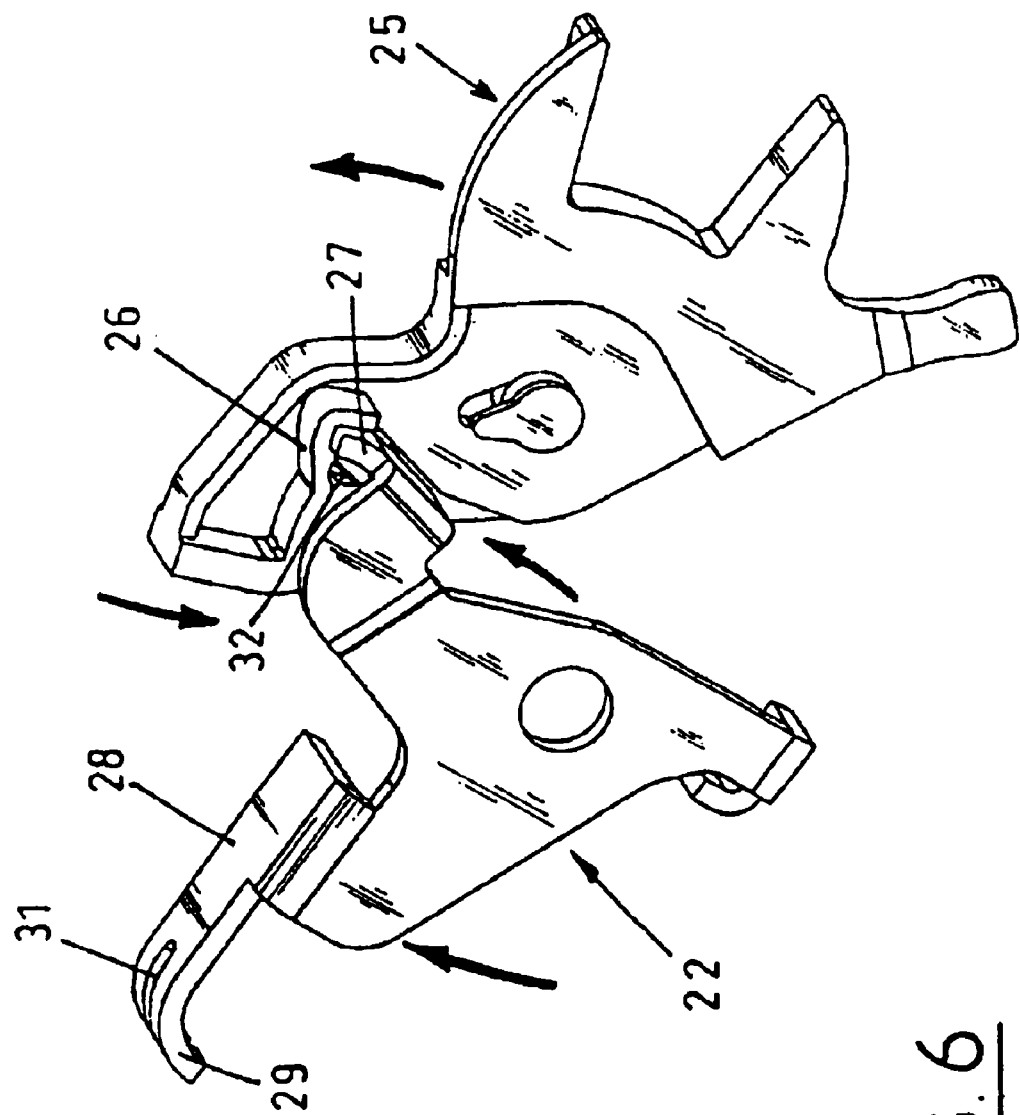
FIG. 6 is a perspective view similar to FIG. 4, showing the successive phase in which the internal opening lever is interlocked in the upper position using the security unlatching element.
Figure 7:
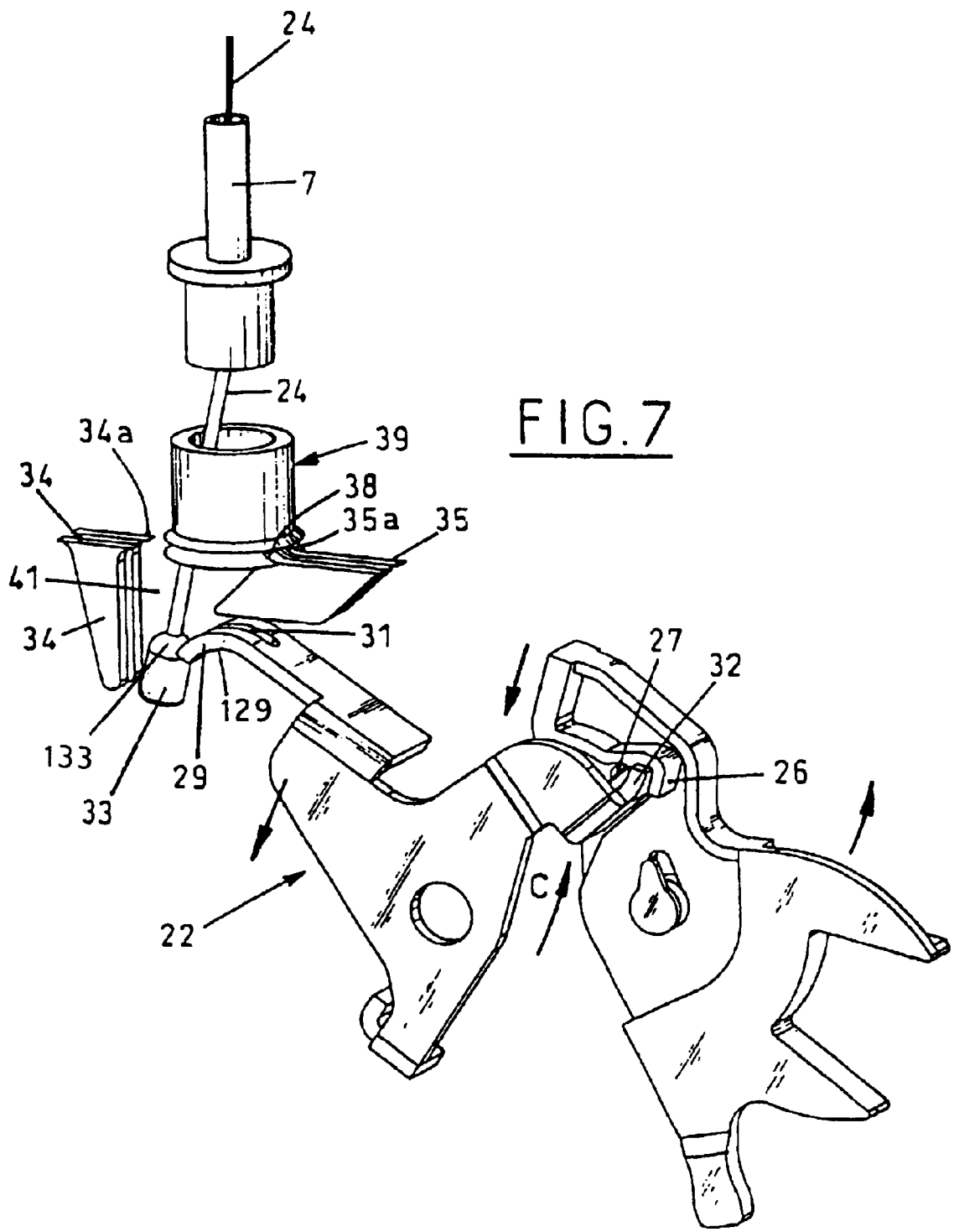
FIG. 7 is a similar view to FIG. 6, depicting the next stage in which the end ferrule of the operating cable is introduced into the lock in order to be hooked up to the internal opening lever.
Figure 8:
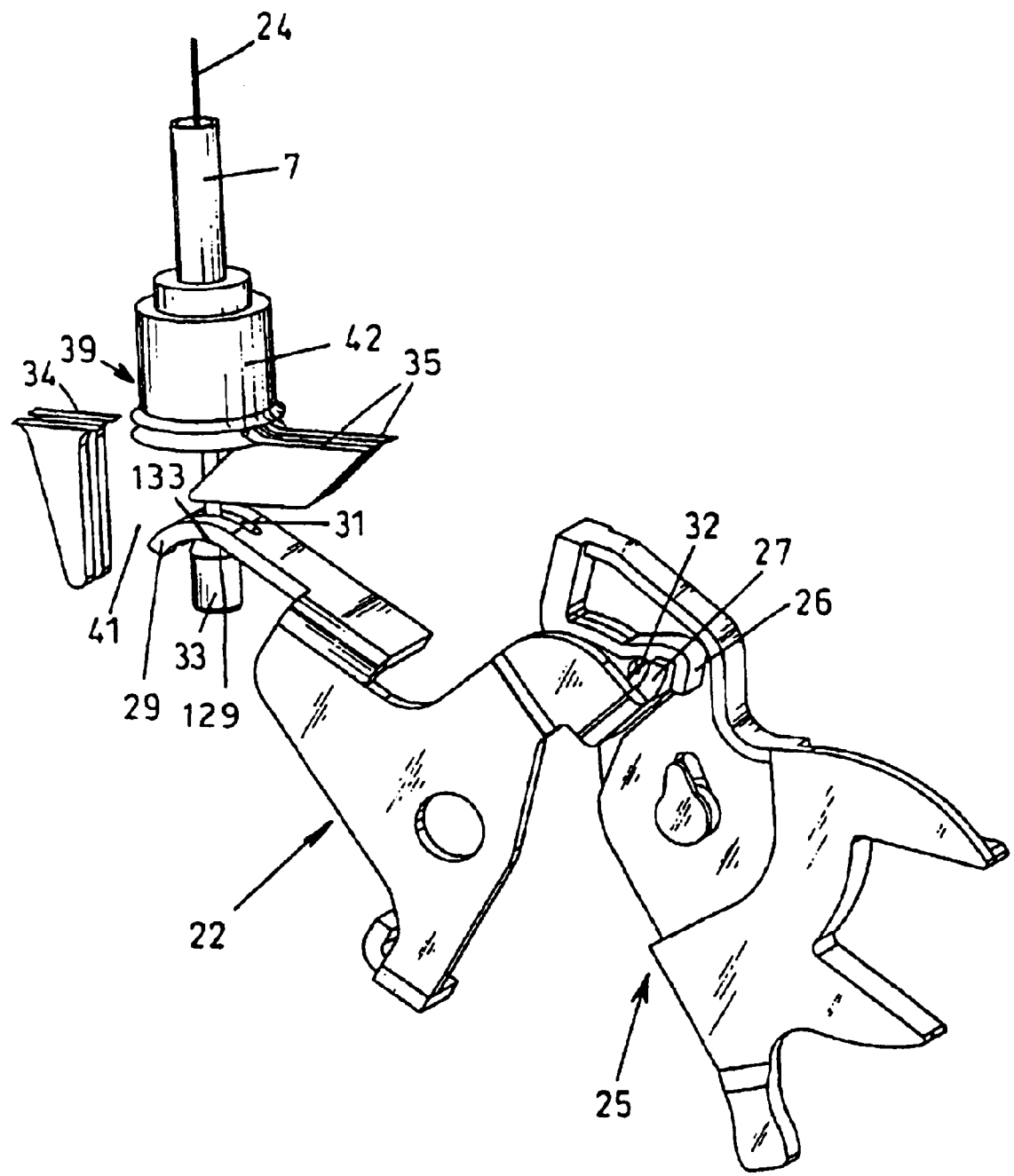
FIG. 8 is a similar view to FIG. 7, showing the ferrule and the operating cable hooked up to the internal opening lever, which is still being held in the interlocked upper position by the security unlatching element.
Figure 9:
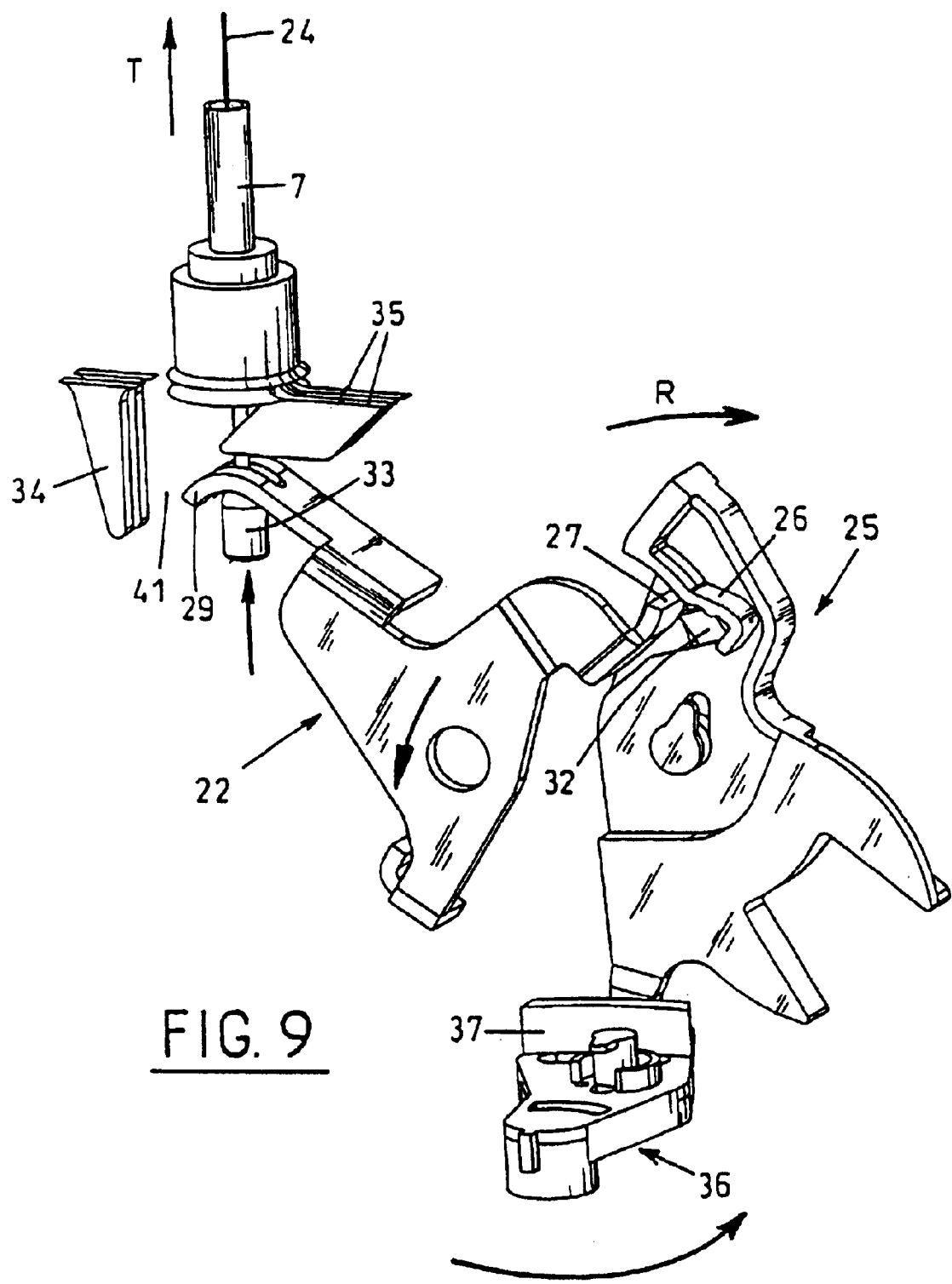
FIG. 9 is a perspective view similar to FIG. 8, showing the start of the process for unlocking the internal opening lever to which the operating cable has been hooked up.
Figure 10:
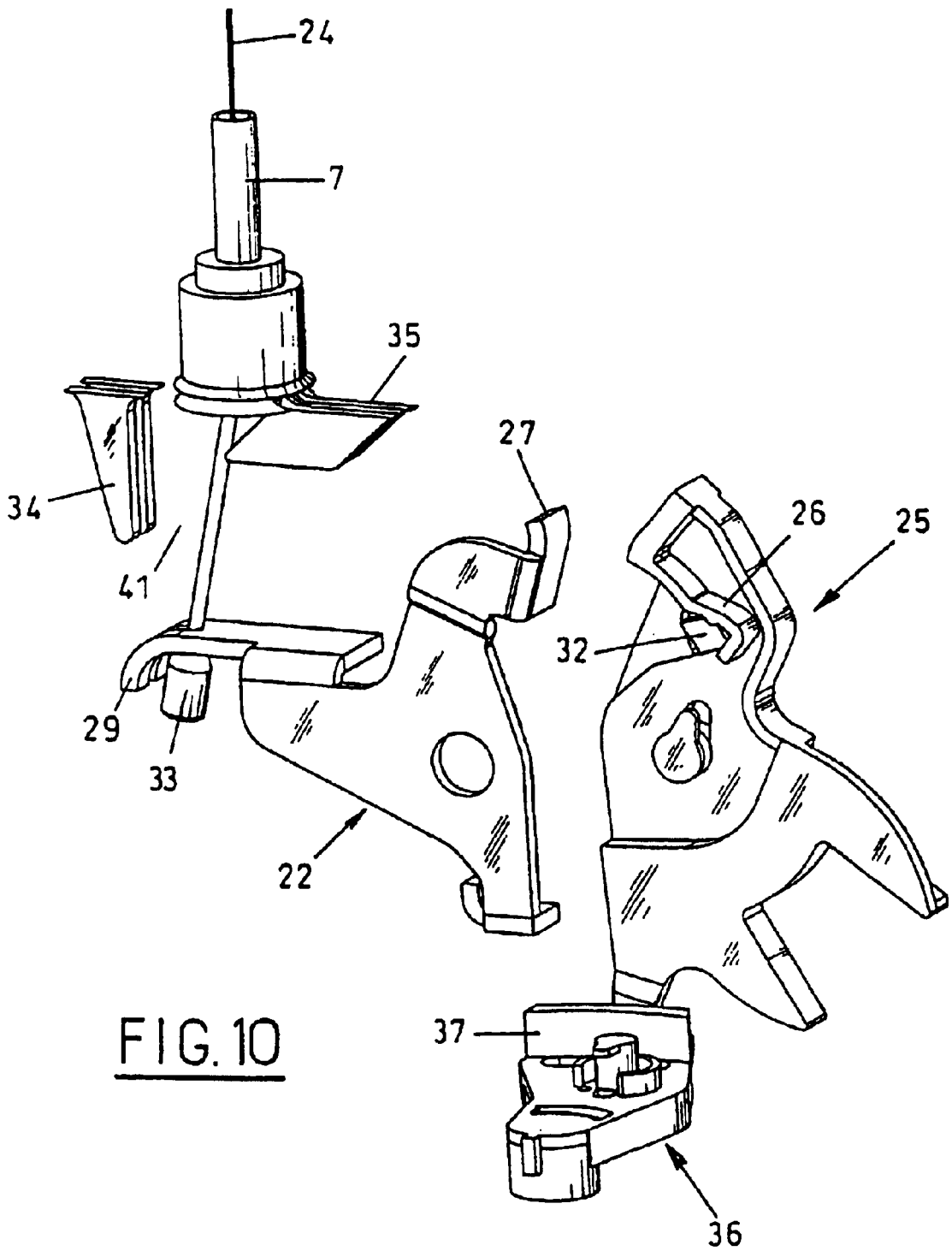
FIG. 10 is a perspective view similar to FIG. 9, showing the internal opening lever returned elastically to the lower position, so enabling the lock to be closed.
Figure 11:
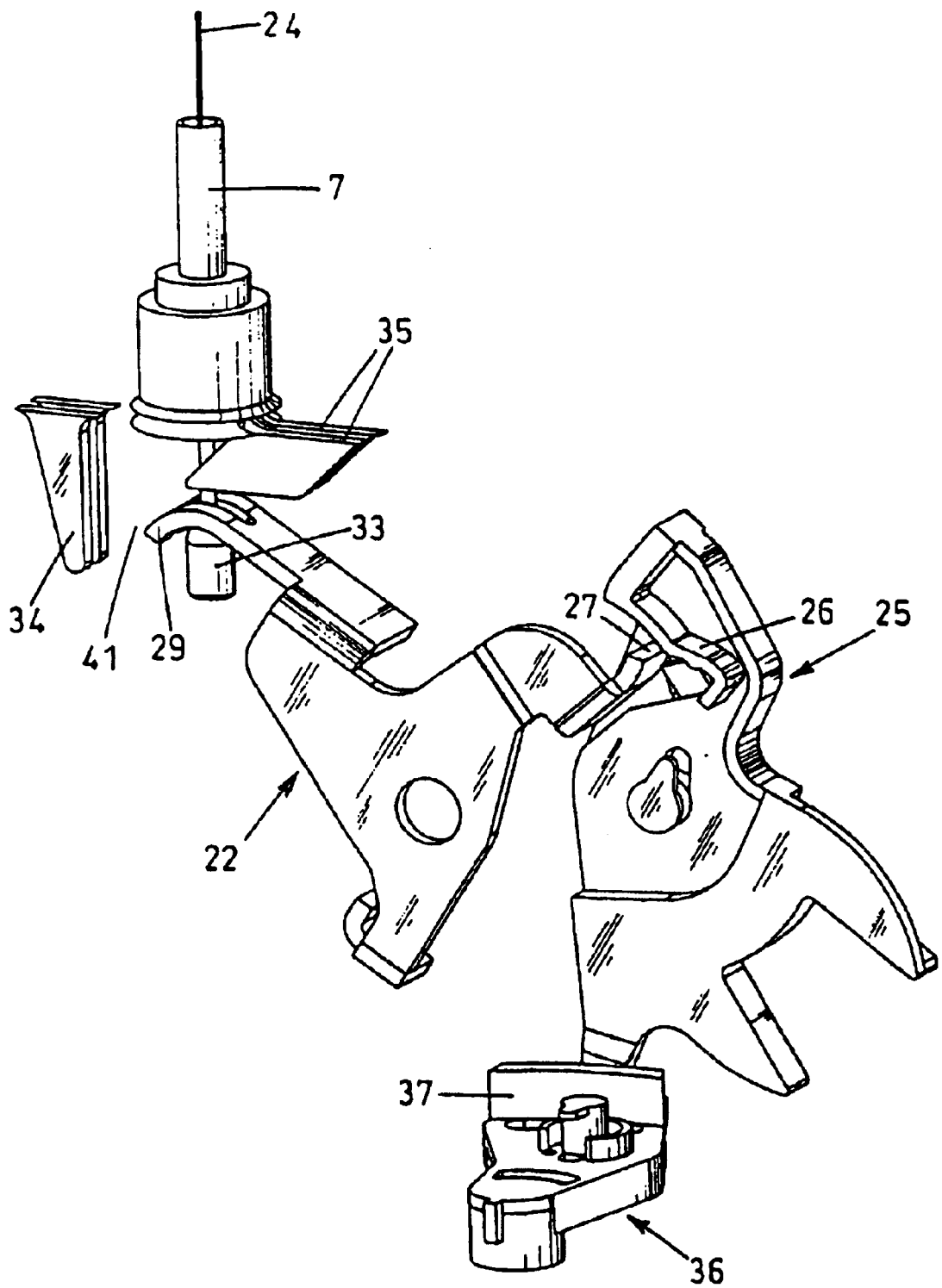
FIG. 11 is a perspective view similar to FIG. 10, showing the internal opening lever in the upper position for opening the door, and the security latching element in a position whereby any new interlocking action with the internal opening lever is prevented.

At the end of this operation the lever 22 is in the position shown in FIG. 6, in which the tongue 27 has been introduced inside the concave profile 22 of the security latching element 25, and the lug 32 lodged behind the tongue 27. Accordingly the lever 22 is interlocked in its upper, opening position. The tongue 27 is held in this interlocked position in the concave configuration 26 by the return torque exerted on the lever 22 by its return spring (arrow C in FIG. 7).

In the phase which follows (FIG. 7), the cover 20 of the lock 1 having been fitted beforehand, the operator introduces the ferrule 33 into the sheath abutment 39. The ferrule 33, guided by the ribs 34, 35 and their gaps 38, drops down into the spout 41 until it reaches a position just below the fork 29 of the lever 22. Then, due to the natural rigidity of the cable 24, the ferrule 33 moves into a position beneath the fork 29 (FIG. 8), in the concave area thereof, with the result that the end of the cable 24 automatically moves into the slot 31, the sheath limit stop 42 positioning itself on the sheath abutment 39. In the FIG. 8 position, a surface 133 on the ferrule 33 has been moved from the FIG. 7 position past an oppositely facing surface 129 on the opening lever 29 into confronting relationship so that lengthwise movement of the cable in the direction of the arrow A in FIG. 8 cause the surface 133 on the ferrule 33 to bear on the surface 129 so as to pivot the opening lever 22.

In the stage which follows (see FIG. 9), the operator manually pulls on the cable 24 (arrow T) so that the ferrule 33 exerts an upward-tipping torque on the lever 22, which relieves the self-locking mechanism (26, 27, 32). At the same time the operator acts manually on the segment-shaped lever 36 so as to tip the security latching element 25 in a clockwise direction (arrow R), and release the tongue 27 from the element 25. To do this, the operator can equally actuate the centralised security latching motor, which drives the segment-shaped lever 36 and tips the element 25 in the clockwise direction R. At the end of this operation, the lever 22 is fully unlocked from the security latching element 25, and its return spring replaces it in the lower, closure position (see FIG. 10). This tipping of the lever 22 towards its lower rest position moves the ferrule 33 and tensions the operating cable 24, which assume the position shown in FIG. 10.

It only remains now to regulate the length of the end of the operating cable 24 projecting from the sheath abutment situated on its control end piece side. This part of the device, relating to the internal opening lever 22, is quite similar to that illustrated in FIG. 1, and the operations involved in adjusting the projecting length I are the same, so that the corresponding operating device has not been shown.

The hooking of the ferrule 33 onto the lever 22 can quite safely and conveniently be carried out "blind" from the outside of the lock, as in the case of the embodiment seen in FIGS. 1 to 3.

The flexible lug 22 and the associated tongue 27 offer the following extra advantage: in the event of a centralised security latching command (via remote control or centralised security latching actuator), when the internal opening lever 22 is manipulated the tongue 27 hinders the tipping of the security latching element 25 by forming a limit stop for the lug 32. The tongue 27 thus prevents the element 25 from positioning itself within the interlocking zone of the internal opening lever 22 for fitting the ferrule of the cable 33. If this were not so, the internal opening lever 22 might stay locked in the upper, opening position by the element 25 after a centralised security latching command, and it would then no longer be possible to close the door.

The arrangement of the tongue 27 and of the flexible lug 32 therefore constitute a safety measure which avoids such a risk.

The invention is not limited to the form of embodiment outlined, and may have alternative variants. Accordingly, for example, the sheath abutments 9, 39 and the guiding spouts 12, 23, 41 may be configured differently from those represented. The assembly of the sheath half-abutments (14, 15) may likewise be performed using any suitable means other than ultrasonic sealing. Moreover, the lock may be fitted with just one device for operating an external opening lever or an internal opening lever by cable.

What is claimed is:

1. An automotive vehicle locking device comprising a system for operating an external opening lever by a cable, said cable having a length and being accommodated in a sheath, said locking device further comprising means for guiding one end of the cable to the external opening lever and automatically into an operative position with the external opening lever, making possible blind connection of the cable and external opening lever by movement of the cable generally parallel to its length relative to the opening lever, said means comprising cooperating surfaces on the opening lever and cable which, by lengthwise movement of the cable in one direction, can be moved past each other and into confronting relationship such that lengthwise movement of the cable oppositely to the one direction causes the surfaces on the opening lever and cable to interact so that the opening lever is repositioned.

2. An automotive vehicle locking device comprising a system for operating an external opening lever by a cable, said cable being accommodated in a sheath, said locking device further comprising means for guiding one end of the cable to the external opening lever and automatically into an operative position with the external opening lever, making possible blind connection of the cable and external opening lever, wherein the vehicle locking device further comprises a housing to which the external opening lever is mounted and a cover on the housing and wherein the one end of the operating cable carries a ferrule and the means for guiding comprise a ferrule-guiding spout formed on the housing, the spout being arranged relative to the external opening lever so as to delimit with said external opening lever a passage for introducing the ferrule as far as a position in which the ferrule is able to hook itself automatically to said external opening lever.

3. Device according to claim 2 wherein the external opening lever has a free end to which the ferrule hooks and the free end of the external opening lever is in the form of a curved fork with a concave area into which the cable can be introduced after being guided by the spout, the ferrule then resting in the concave area of said curved fork.

4. Device according to claim 2 wherein the cover extends into a first sheath abutment comprising two complementary sheath half-abutments which extend over a first sheath limit stop through which the cable passes, the sheath half-abutments being sealingly assembled to one another.

5. Device according to claim 4 wherein the sheath half-abutments are sealingly assembled by ultrasonic sealing.

6. Device according to claim 2 wherein the cable has a control end piece and the operating system comprises a second sheath abutment spaced from the guiding means, and a second sheath limit stop, the cable extending beyond this second sheath abutment for a given length and fitted with a manual operating handle, wherein a shim is provided for regulating said given length of the cable, said shim being interposed between the second sheath limit stop and the cable control end piece.

7. An automotive vehicle locking device comprising a system for operating an internal opening lever by a cable having spaced ends and a length, the internal opening lever placeable selectively in normal and opening positions, the vehicle locking device comprising means for guiding one of the spaced ends of the cable as far as the internal opening lever with the internal opening lever in the opening position at the time that the vehicle locking device is installed, and means for automatically holding said internal opening lever in the opening position whilst the one end of the cable is introduced as far as the internal opening lever by movement of the cable generally parallel to its length relative to the opening lever, said means comprising cooperating surfaces on the opening lever and cable which, by lengthwise movement of the cable in one direction, can be moved past each other and into confronting relationship such that lengthwise movement of the cable oppositely to the one direction causes the surfaces on the opening lever and cable to interact so that the opening lever is repositioned.

8. Device according to claim 7, characterised in that said means for holding the internal opening lever in the opening position comprise a security latching element incorporating a profiled configuration arranged so as to cooperate with a tongue of the internal opening lever, after the latching element has been rotated towards the internal opening lever, in order to cause said internal opening lever to become interlocked in the lock opening position.

9. An automotive vehicle locking device comprising a system for operating an internal opening lever by a cable having spaced ends, the internal opening lever placeable selectively in normal and opening positions, the vehicle locking device comprising means for guiding one of the spaced ends of the cable as far as the internal opening lever with the internal opening lever in the opening position at the time that the vehicle locking device is installed, and means for automatically holding said internal opening lever in the opening position whilst the one end of the cable is introduced as far as the internal opening lever, wherein the security latching element is provided with a flexible lug which protrudes from the profiled configuration and faces the tongue of the internal operating lever, it being necessary to depress the lug so as to enable the tongue of the internal operating lever to be introduced as far as to be interlocked in the profiled configuration of the security latching element, then resuming a position which enables the tongue to be released and the internal operations lever to return to its normal position by means of the tongue sliding over said lug.

10. Device according to claim 9, wherein the locking device further comprises a housing and characterised in that the internal opening lever is constituted by a bent fork facing a spout for guiding a ferrule fixed on the end of the cable, and delimited by an assembly of ribs incorporated on the housing.

11. Device according to claim 10, wherein a ferrule is attached to the cable and characterised in that the ribs are separated from each other by gaps which guide the ferrule.

* * * * *